US008417068B2

(12) United States Patent
Yamazoe

(10) Patent No.: US 8,417,068 B2
(45) Date of Patent: Apr. 9, 2013

(54) IMAGE PROCESSING APPARATUS

(75) Inventor: Manabu Yamazoe, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 492 days.

(21) Appl. No.: 12/549,972

(22) Filed: Aug. 28, 2009

(65) Prior Publication Data

US 2010/0067787 A1    Mar. 18, 2010

(30) Foreign Application Priority Data

Sep. 12, 2008  (JP) ................................. 2008-235198

(51) Int. Cl.
*G06K 9/00*    (2006.01)
(52) U.S. Cl. ......................... 382/305; 358/1.15; 382/181
(58) Field of Classification Search ........................ None
See application file for complete search history.

(56) References Cited

U.S. PATENT DOCUMENTS

| | | | |
|---|---|---|---|
| 7,639,836 B2 * | 12/2009 | Ito | 382/100 |
| 8,040,551 B2 * | 10/2011 | Ono et al. | 358/1.18 |
| 2003/0068100 A1 * | 4/2003 | Covell et al. | 382/305 |
| 2006/0120618 A1 * | 6/2006 | Mizoguchi | 382/255 |
| 2006/0150091 A1 * | 7/2006 | Suzuki et al. | 715/517 |
| 2007/0070408 A1 * | 3/2007 | Ono et al. | 358/1.15 |
| 2007/0242284 A1 * | 10/2007 | Schalkwijk et al. | 358/1.6 |
| 2009/0245624 A1 * | 10/2009 | Hamanaka | 382/154 |
| 2011/0216368 A1 * | 9/2011 | Tsue et al. | 358/1.15 |

FOREIGN PATENT DOCUMENTS

| | | |
|---|---|---|
| JP | 11232007 A | 8/1999 |
| JP | 2007249434 A | 9/2007 |

* cited by examiner

*Primary Examiner* — Claire X Wang
*Assistant Examiner* — Thomas A James
(74) *Attorney, Agent, or Firm* — Fitzpatrick, Cella, Scinto & Harper

(57) ABSTRACT

Provided is an image processing apparatus configured to preferentially extract an image with high user satisfaction when multiple images are automatically extracted from an image group. A user specifies the number of images to be extracted from the image group. The image group is classified into a first image group with high user satisfaction and a second image group with low user satisfaction. When the number of images extracted from the first image group does not reach the specified number, an image having only a dissatisfaction factor acceptable to the user is additionally extracted.

20 Claims, 10 Drawing Sheets

IMAGE PROCESSING APPARATUS

BACKGROUND OF THE INVENTION

1. Field of the Invention

The present invention relates to an image processing apparatus extracting a required number of images with high user satisfaction from multiple images at the time of creating an album or performing index printing after the multiple images are collected.

2. Description of the Related Art

Diffusion of digital still cameras and increase in capacity of recording media have made it possible to easily take a large number of pictures and to store those pictures as images in the recording media. Thus, even a general user can decorate the stored images and adjust a layout of the images, and consequently make advanced layout printing including multiple-sheet printing and the like, such as album and index printing. Meanwhile, various methods have been proposed to implement such advanced layout printing. For example, Japanese Patent Laid-Open No. H11-232007 (1999) proposes a method in which, when the number of images extracted by a user does not reach the number of images that can be laid out on a predetermined layout, an image following the last extracted image is automatically extracted and arranged in a region where no image is arranged yet. Moreover, Japanese Patent Laid-Open No. 2007-249434 proposes an album creation system configured to, when the number of images extracted by a user does not reach the number of images required to create an album, analyze information on multiple inputted images, and then acquire an additionally extracted image from an image database on the basis of a result of the analysis.

However, in the method described in Japanese Patent Laid-Open No. H11-232007 (1999), when the number of good images (images satisfactory to the user) extracted by the user does not reach the number of images that can be laid out, subsequently extracted images may not be good always. Specifically, an image that is apparently dissatisfactory to the user (failure image) may be automatically extracted. Here, the "failure image" is an image including at least one "dissatisfaction factor" such as underexposure, poor color balance, slur/blurring and poor composition. Moreover, also the album creation system described in Japanese Patent Laid-Open No. 2007-249434 may extract apparent failure images as additional images when many failure images are included in the image database.

SUMMARY OF THE INVENTION

The present invention provides an image processing apparatus configured to extract a good image or a relatively good image when the number of good images extracted by a user does not reach the number specified by the user (hereinafter referred to as the "user-specified number"), by selecting an image with minor failure content and level from failure images.

An image processing apparatus of the present invention includes: unit for classifying an image group including a plurality of images into a first image group with user satisfaction higher than a set reference and a second image group with user satisfaction lower than the set reference; and unit for extracting an image from the second image group on the basis of a dissatisfaction factor selected as acceptable to a user, in a case where the number of images included in the first image group does not reach a specified number, until the number of images reaches the specified number.

Another image processing apparatus of the present invention includes: unit for classifying an image group including a plurality of images into a first image group with user satisfaction higher than a set reference and a second image group with user satisfaction lower than the set reference; and unit for extracting an image with high user satisfaction from the second image group, in a case where the number of images included in the first image group does not reach a specified number, until the number of images reaches the specified number.

According to the present invention, the image group is classified into images with relatively high user satisfaction and images with relatively low user satisfaction. Next, when the number of extracted images with the relatively high user satisfaction does not reach the user-specified number, the image with minor dissatisfaction factor content and level is extracted from the images with the relatively low user satisfaction. Specifically, an image of which dissatisfaction factor level can be determined to be acceptable to the user is additionally extracted. Therefore, according to the present invention, only the images with relatively high user satisfaction can be extracted without extracting images with apparently low user satisfaction.

Further features of the present invention will become apparent from the following description of exemplary embodiments (with reference to the attached drawings).

DESCRIPTION OF THE EMBODIMENTS

With reference to the drawings, an embodiment of the present invention will be described in detail below.

Figure 1:
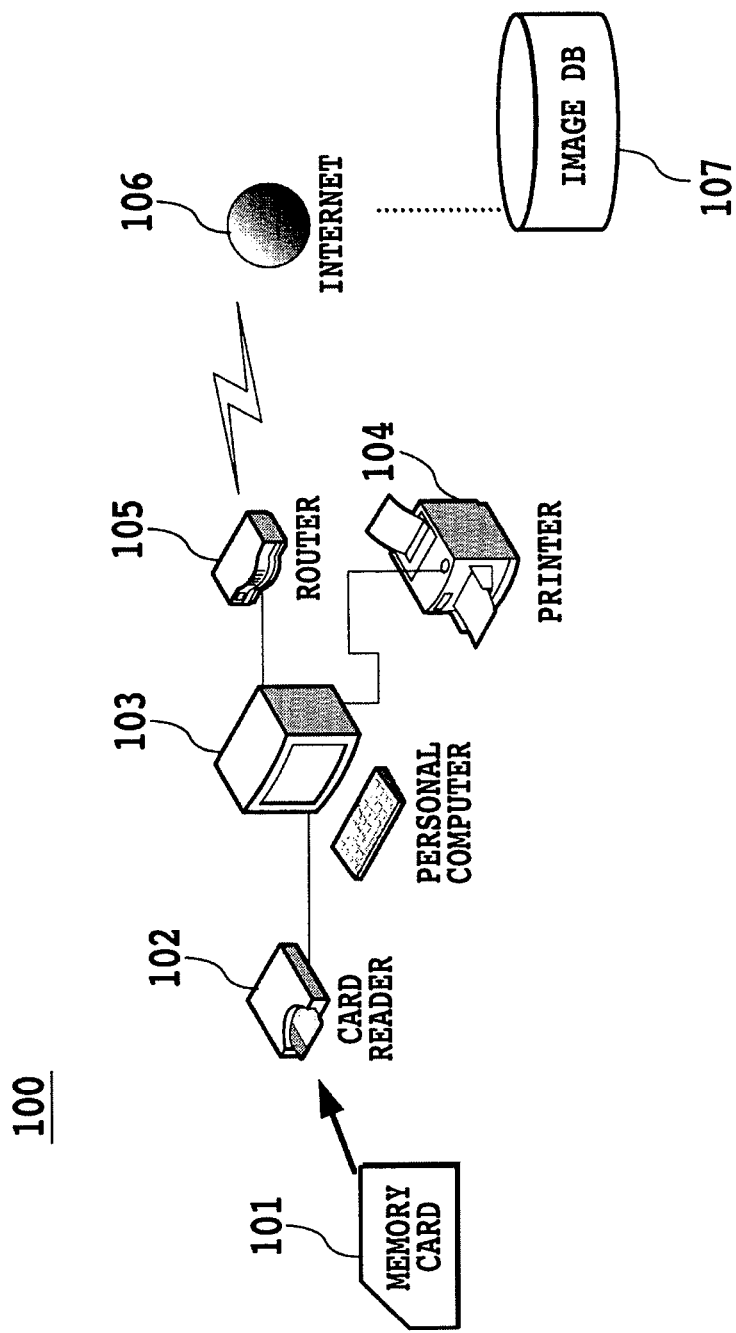
FIG. 1 is a view showing an example of an image extraction system.

FIG. 1 is a view showing an example of an image extraction system to which the present invention can be applied.

An image extraction system 100 includes, for example, a memory card 101, a card reader 102, a personal computer 103, a printer 104, a router 105, the Internet 106 and an image database 107.

The memory card 101 is a recording medium (such as a flash memory card) which is used in a digital still camera and the like.

The card reader 102 reads image data recorded in the memory card 101 and sends the data to the personal computer 103.

The personal computer 103 executes image processing such as image extraction processing for the image data received from the card reader 102 and stores the image data in a recording medium such as a hard disk (not shown). In the personal computer 103, application software having an image extraction function is installed. Moreover, the personal computer 103 can store image data in the remote image database (image DB) 107 through the router 105 and the Internet 106. The image extraction processing may be executed by a device other than the personal computer. In the following description, the personal computer 103 will be referred to as an image processing apparatus 103.

The printer 104 uses images extracted by the image processing apparatus 103 to execute printing of an album book or index printing.

Figure 2:
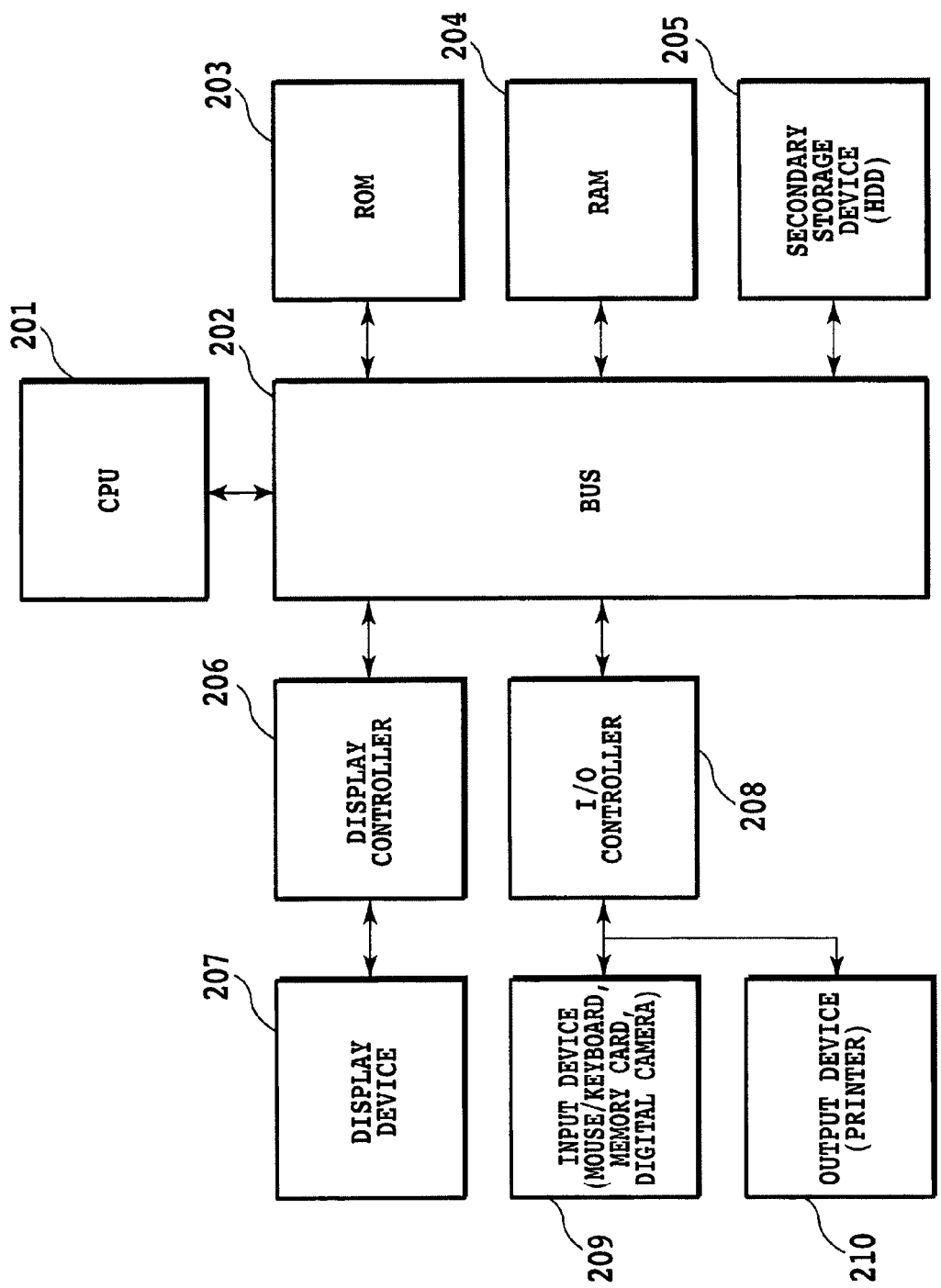
FIG. 2 is a block diagram showing a hardware configuration of an image processing apparatus according to the present invention.

FIG. 2 is a block diagram showing a hardware configuration inside the image processing apparatus 103 and peripheral devices.

The image processing apparatus 103 includes a CPU 201, a bus 202, a ROM 203, a RAM 204, a secondary storage device 205 such as a HDD, a display controller 206, a display device 207 and an I/O controller 208. In FIG. 2, an input device 209 and an output device 210 are connected as peripheral devices to the image processing apparatus 103.

The secondary storage device 205 stores image data, an OS, application software and the like. The OS manages basic functions usable by an image processing program according to this embodiment as well as applications, and provides a basic graphical user interface (GUI). The application utilizes the GUI provided by the OS to provide a UI realizing functions unique to the application.

The display controller 206 receives a user operation and performs control for displaying a GUI screen on the display device 207. The display device 207 is a liquid crystal display, a CRT display or the like.

The I/O controller 208 is an I/O interface configured to control input and output of data between the input device 209 and the output device 210. The I/O controller 208 is, for example, a universal serial bus (USB) or a personal system/2 (PS/2).

Besides an input device such as a keyboard or a mouse, the input device 209 is a recording medium such as a digital camera, a USB memory, a compact flash (CE) memory and a secure digital (SD) memory card. The image processing apparatus 103 reads image data from the input device 209 and performs image extraction processing and the like to be described later for the image data.

The output device 210 is a printer configured to print the image data after image processing.

Figure 4:
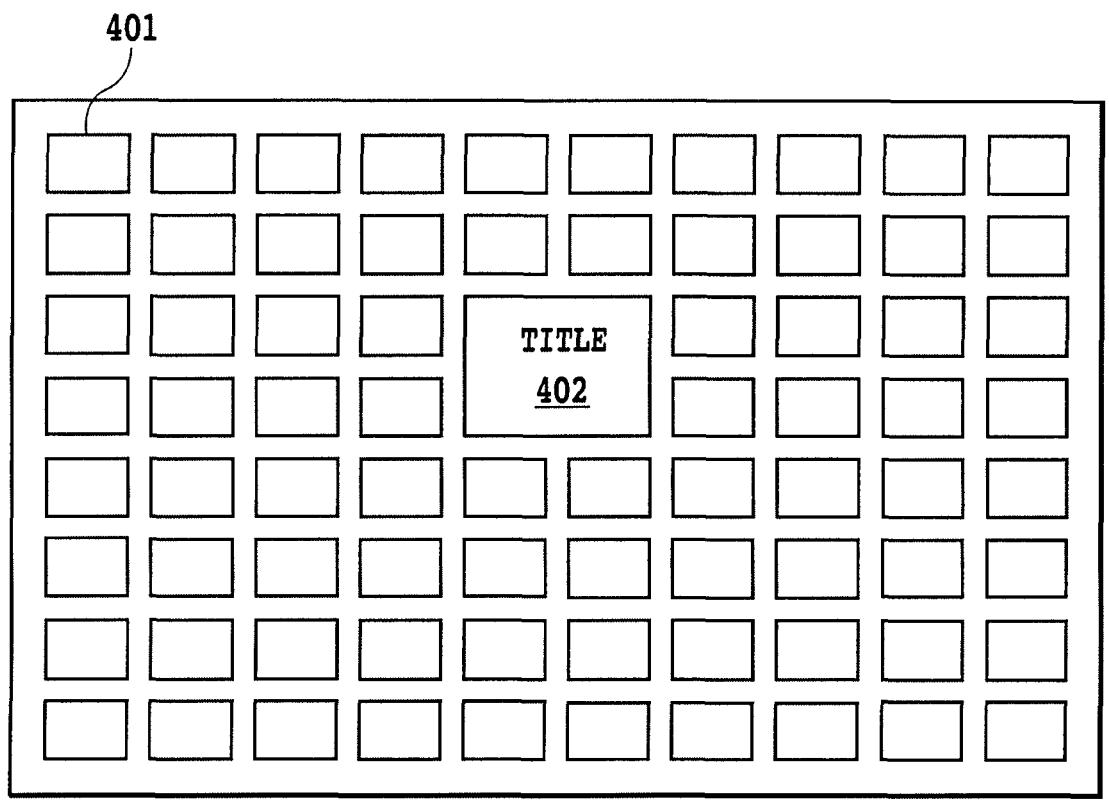
FIG. 4 is a view showing an example of a layout template according to the present invention.

FIG. 4 is a view showing an example of a layout template.

This template has a layout in which multiple images 401 are arranged and a title 402 is arranged in a predetermined region within one page. Use of this layout template enables a group of a large number of pictures (image group) capturing scenes from a children's athletic meet, for example, to be arranged within one page such as a scrapbook.

In the case of the template shown in FIG. 4, there are a large number of images to be arranged, and the number of images that can be arranged within one page is previously determined. Thus, the user has to sort out the large number of images to be arranged within one page. The user may find this troublesome to extract a predetermined number of and a large number of adopted images, from the image group including a large number of images. For example, when the user extracts images only by his/her own subjectivity, a number of images taken in the same time period are extracted. As a result, subjects included in the extracted images may be biased. Moreover, extraction of a predetermined number of only images satisfactory to the user requires trial and error and thus takes time. Consequently, the image processing apparatus 103 according to this embodiment performs the following processing to extract only images with relatively high user satisfaction and to reduce the load on the user caused by an extraction operation.

Figure 3:
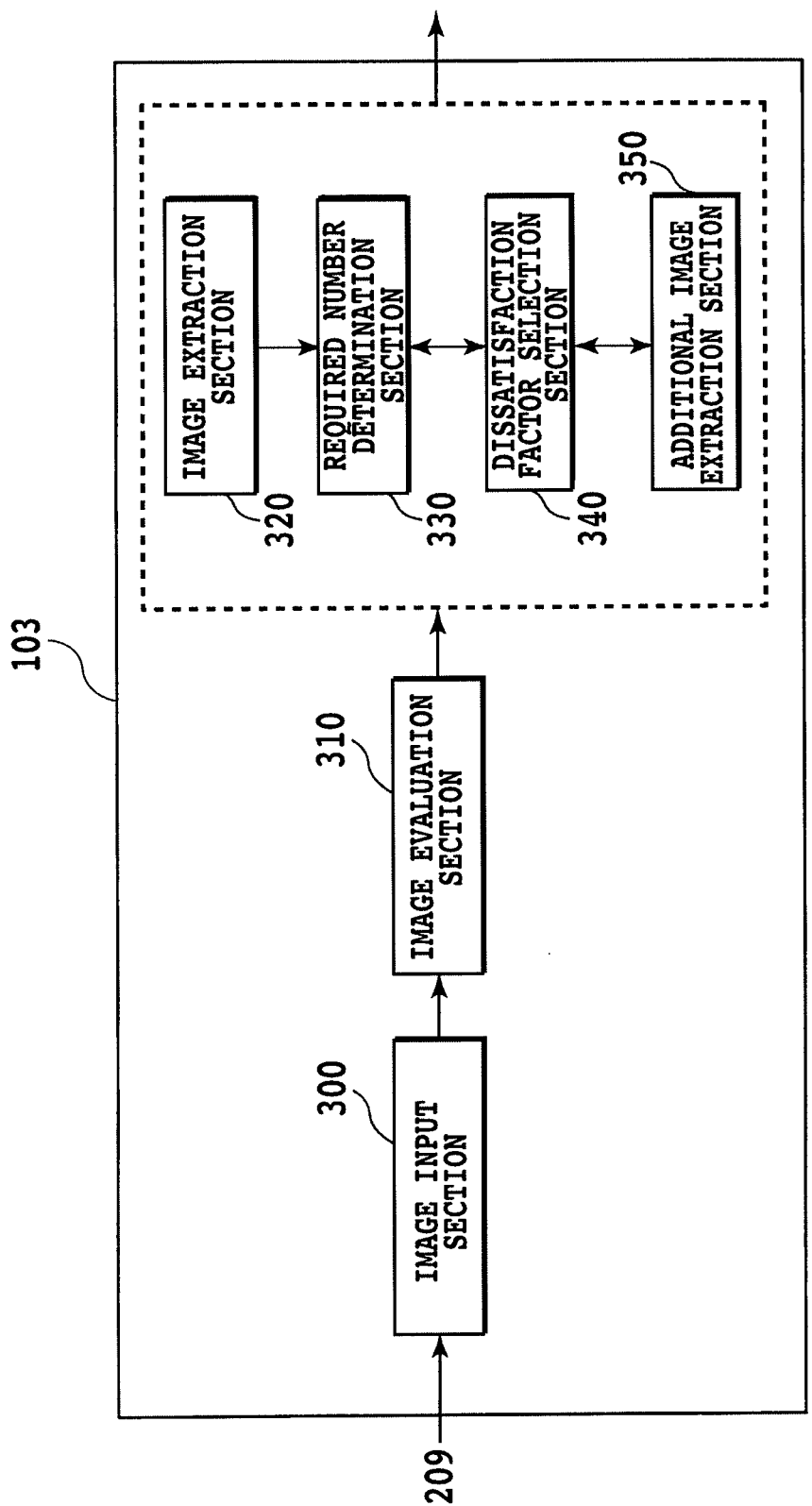
FIG. 3 is a functional block diagram showing an example of functions of the image processing apparatus according to the present invention.

FIG. 3 is a functional block diagram for explaining functions of the image processing apparatus 103.

The image processing apparatus 103 includes an image input section 300, an image evaluation section 310, an image extraction section 320, a required number determination section 330, a dissatisfaction factor selection section 340 and an additional image extraction section 350.

The image input section 300 receives from the input device 209 an image group to be extracted.

The image evaluation section 310 sets user satisfaction evaluation, such as overall satisfaction for individual images and presence or absence of dissatisfaction items, according to an instruction from the user.

Based on the evaluation set by the image evaluation section 310, the image extraction section 320 classifies images into a first image group for images with user satisfaction higher than a set reference and a second image group for images with user satisfaction lower than the set reference. The image extraction section 320 extracts the images with user satisfaction higher than the set reference as adopted images. This will be described later.

The required number determination section 330 determines whether or not the number of the adopted images extracted by the image extraction section 320 has reached a user-specified number of images. When the number of the adopted images extracted by the image extraction section 320 has reached the user-specified number, the image extraction processing is completed. On the other hand, when the number of the adopted images has not reached the user-specified number, the processing moves to processing by the dissatisfaction factor selection section 340 so as to further extract adopted images.

The dissatisfaction factor selection section 340 selects a dissatisfaction factor acceptable to the user, in accordance with an instruction received from the user. Examples of the dissatisfaction factor include underexposure, poor color balance, slur/blurring, poor composition and the like.

Based on a result of the selection by the dissatisfaction factor selection section 340, the additional image extraction section 350 extracts, as an additional image, an image having only the dissatisfaction factor acceptable to the user from the images (images with relatively low user satisfaction) which are not extracted by the image extraction section 320.

Next, description will be given of a flow of the image extraction processing according to this embodiment.

Figure 5:
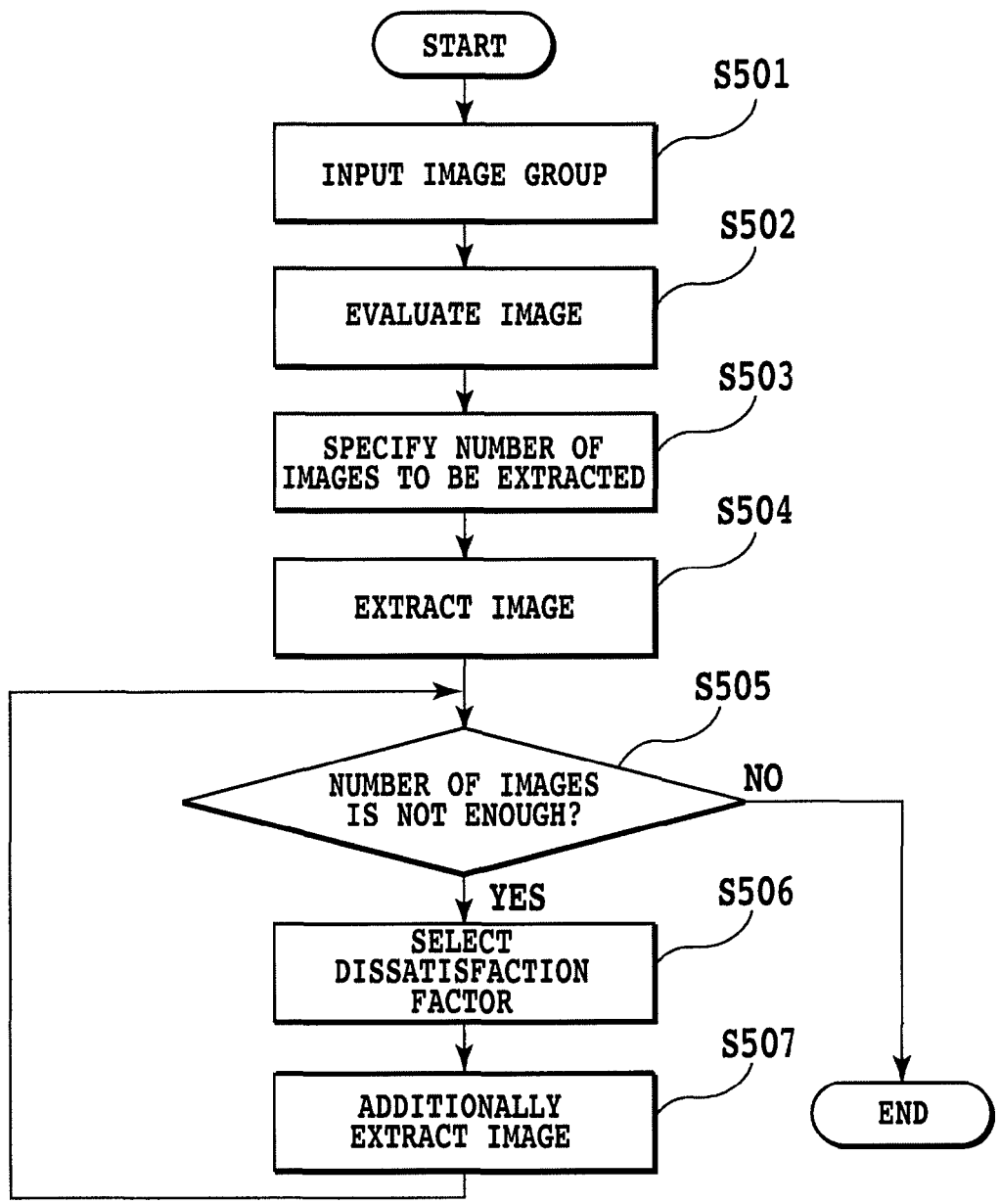
FIG. 5 is a flowchart showing an example of image extraction processing according to the present invention.

FIG. 5 is a flowchart showing a flow of the above series of processing by the image processing apparatus 103.

In S501, the image input section 300 receives an image group from the input device 209.

In S502, the image evaluation section 310 sets the user satisfaction evaluation, such as overall satisfaction for individual images and presence or absence of dissatisfaction items, according to an instruction from the user. The processing in S502 will be described in detail below.

Figure 6:
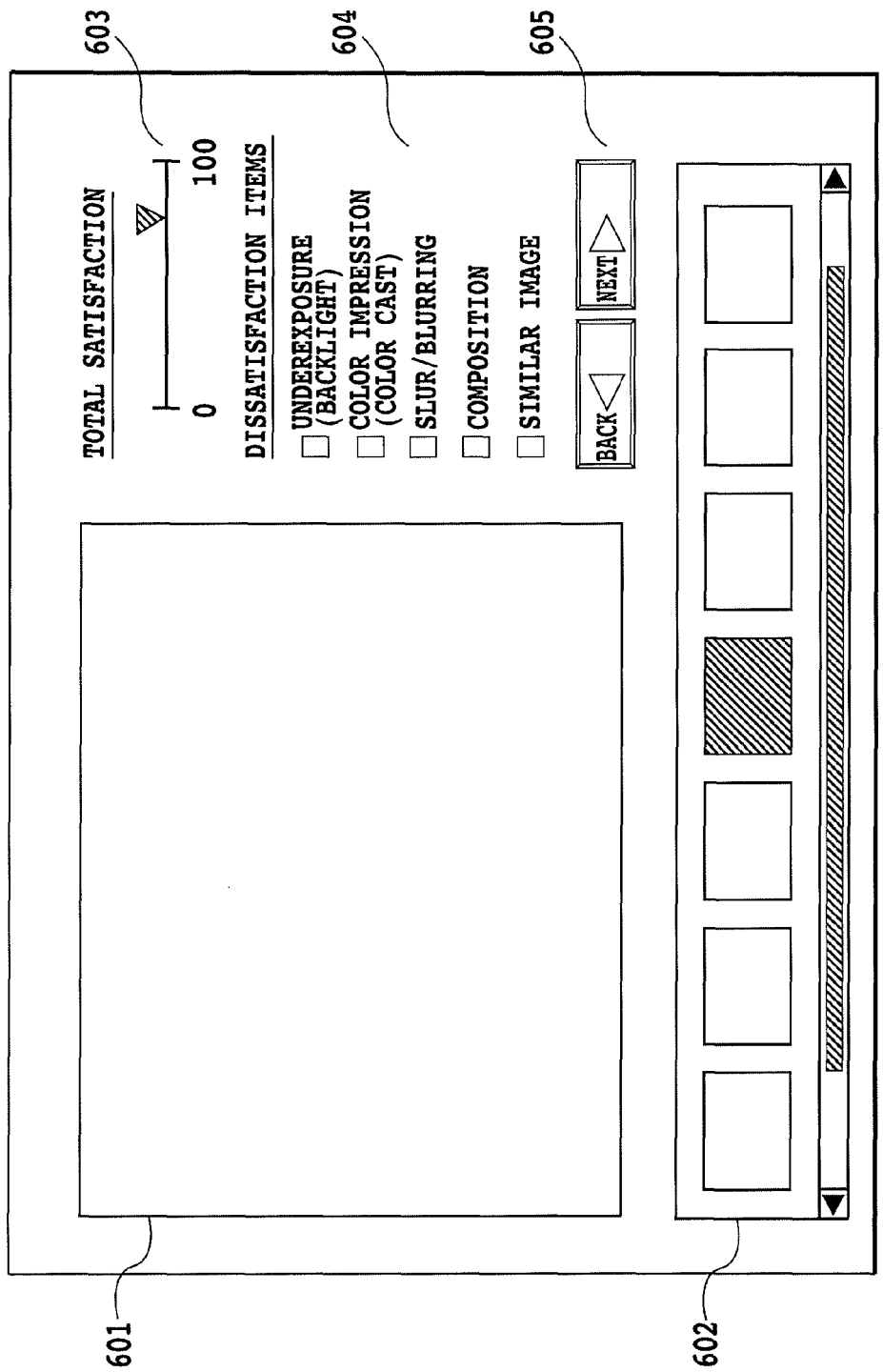
FIG. 6 is a view showing an example of a user interface provided in image determination according to the present invention.

FIG. 6 is a view showing an example of a user interface (UI) screen related to the processing in S502.

The image evaluation section 310 sequentially displays the images in the image group inputted in S501, on the UI screen. Then, the image evaluation section 310 determines the user satisfaction for each of the images according to specification and setting made by the user through the UI screen, and subsequently, stores a result of the determination.

The UI screen includes an image display region 601, a thumbnail display region 602 as well as a slide bar 603 and check boxes 604 for setting evaluation on the images.

First, the image evaluation section 310 displays one image among the inputted image group, in the image display region 601. Moreover, the image evaluation section 310 displays thumbnails in the thumbnail display region 602. A thumbnail is an image whose size is reduced to display a list of a number of images. By looking at the thumbnails, the user can easily check the overall connection between the images of the image group as well as a time-sequence relationship between, for example, continuously shot scenes. The image evaluation section 310 may be configured to, for example, change the color of a frame of a thumbnail or add a mark to the thumbnail in order to indicate which one of the images in the image group is being displayed on the image display region 601.

The user evaluates the individual images. First, the user uses the slide bar 603 to set overall satisfaction for the image displayed in the image display region 601, by his/her own subjectivity. Here, when the user sets the overall satisfaction to 100%, the image is considered to have no dissatisfaction factor. On the other hand, when the user sets the overall satisfaction to less than 100%, the image is considered to have some kind of dissatisfaction factor. In such a case, the user checks any of the check boxes 604 of the dissatisfaction items to set what point of the image the user is dissatisfied with. For example, in the case of an image in which the subject is underexposed due to backlit shooting, the user checks the check box of "UNDEREXPOSURE (BACKLIGHT)." There may be more than one dissatisfaction factor in one image. Thus, it is preferable that the check boxes for the multiple dissatisfaction factors can be checked at the same time.

When the evaluation for one image is finished, the user presses a NEXT button 605 to evaluate a next image. An evaluation result for each image is associated with the image and stored in, for example, the secondary storage device 205.

Moreover, the present invention may employ a configuration (not shown) in which the level of dissatisfaction is set for each dissatisfaction factor by use of the slide bar. For example, the configuration may be such that the level of slur can be set for a slurred image by use of the slide bar. Such a configuration may lead to a case where, for example, when slur is the only dissatisfaction factor of the image and the level of the slur is low, the image is determined to be adoptable in subsequent processing depending on the print size of the image.

The above example is a configuration in which the user manually sets the image evaluation. However, the image evaluation section 310 may be configured to automatically perform the image evaluation. For example, the image evaluation section 310 may be configured to determine the exposure quality by analyzing a histogram of a subject in the image. Moreover, the image evaluation section 310 may be configured to estimate color balance by analyzing a highlight point of the image. Furthermore, since the evaluation result is stored in association with the corresponding image managed in a local or server image DB, the processing in S502 may be omitted when different numbers of images are extracted simply from the same image group.

In S503, the number of images to be extracted is specified by the user as a user-specified number.

In S504, the image extraction section 320 extracts adopted images from the image group on the basis of the evaluation result obtained by the image evaluation section 310 and of the user-specified number. The processing in S504 will be described in detail below.

If the number of only the images with 100% overall satisfaction reaches the user-specified number, the image extraction section 320 sets those images as the adopted images. However, images in an image group that are taken by an amateur usually include many failure images. Thus, it is rather likely that the number of only the images with 100% overall satisfaction does not reach the user-specified number. Consequently, in S504, the image extraction section 320 provides a set reference (an overall satisfaction threshold) for classifying the image group into images with high user satisfaction and images with low user satisfaction. For example, the overall satisfaction threshold is set to 80% and thereby images evaluated to have 80% to 100% overall satisfaction are extracted. Here, the overall satisfaction threshold may be changed according to the user-specified number that is specified in S503. Specifically, when the user-specified number is small, a strict adoption criterion may be set by setting a high overall satisfaction threshold. On the other hand, when the user-specified number is large, a loose adoption criterion may be set by setting a low overall satisfaction threshold.

Meanwhile, a time stamp is added to an image when the image is taken by a digital still camera. Therefore, the image extraction section 320 may be configured to extract images whose shooting times are not biased by analyzing and utilizing the time stamps. Specifically, the image extraction section 320 may be configured to obtain a distribution of the shooting times based on the time stamps and to automatically extract the images according to the distribution. Furthermore, the number of images extracted in S504 may be set smaller than the user-specified number. For example, the present invention may employ a configuration in which the number of images extracted in S504 covers about 80% of the user-specified number and the user can manually extract the remaining 20%. This is because, while an operation of sorting out the images one by one from an image group including a large number of images imposes heavy load on the user, an operation of sorting out the remaining 20% after completion of extraction of about 80% of the specified number can be enjoyable to the user.

In S505, the required number determination section 330 determines whether or not the number of adopted images extracted in S504 has reached the user-specified number. When the determination result shows that the number of the adopted images extracted in S504 has reached the user-specified number, the extraction processing is completed. On the other hand, when the number of the adopted images has not reached the user-specified number, the processing moves to S506 where the dissatisfaction factor is selected by the user. Subsequently, in S507, the additional image extraction section 350 performs processing of additionally extracting images until the number of the adopted images reaches the user-specified number. Specifically, as described above, the image with minor dissatisfaction factor content and level (the image of which dissatisfaction factor level can be determined to be acceptable to the user) is additionally extracted from the images with relatively low user satisfaction.

Next, the processing in S504 to S507 will be described in detail from the viewpoint of the user interface (UI).

Figure 7:
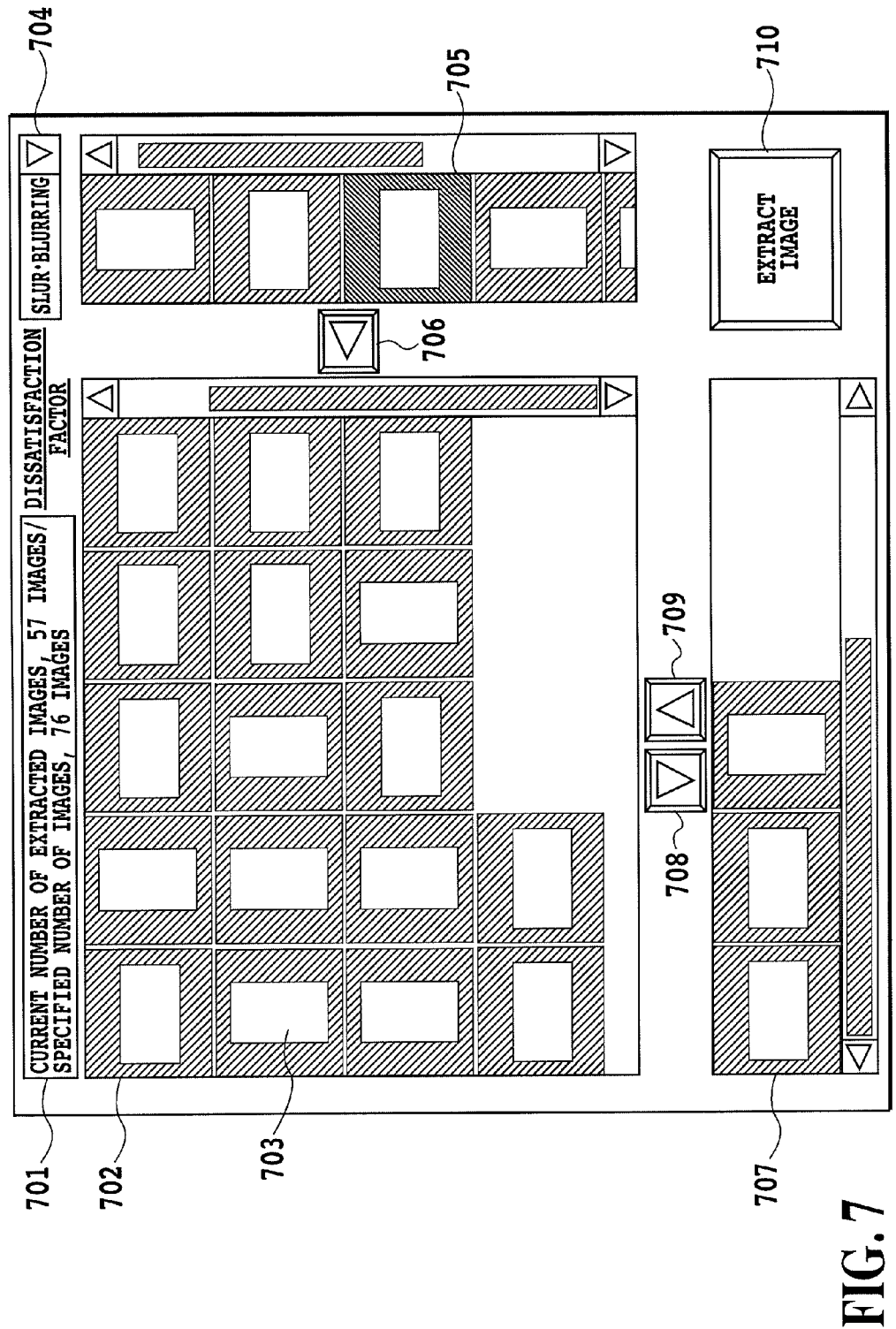
FIG. 7 is a view showing an example of a user interface provided in image addition according to the present invention.

FIG. 7 is a view showing an example of a user interface screen displayed on the display device 207 in S504 to S507.

In S504, the image extraction section 320 displays the user-specified number and the number of the extracted images in a region 701. In FIG. 7, the region 701 shows that the user-specified number is 76 and the number of images extracted in S504 is 57. Next, the image extraction section 320 displays thumbnails of the extracted images in an extracted image display region 702. The thumbnails may be displayed in a vertical direction or in a horizontal direction depending on directions of the images. Moreover, in order for the user to more specifically check and compare the images in the image group, the image extraction section 320 may be configured to display an enlarged image of the corresponding thumbnail in another window when the user clicks on the thumbnail with the mouse.

In S505, the required number determination section 330 determines whether or not the current number of extracted images has reached the user-specified number. When the current number of extracted images has not reached the user-specified number, the dissatisfaction factor selection section 340 displays a dissatisfaction factor in a combo box 704. Here, the combo box is a function used to input or select an item on an operation screen, and is obtained by combining a rectangular region (text box) for entering characters with an item select list (list box). Not only can characters be directly entered in the text box but also a list of selectable items can be displayed by pressing a right edge button in the text box and one item can be selected therefrom.

In S506, the user selects an acceptable dissatisfaction factor from among the dissatisfaction factors (underexposure, poor color balance, slur/blurring, poor composition and the like) through the combo box. In response to the selection by the user, the additional image extraction section 350 displays, in a region below the combo box 704, a list of thumbnails of the images classified as the images having the selected dissatisfaction factor. On this screen, thumbnails of the images classified as the images having "slur/blurring" are displayed.

When the user selects a thumbnail 705 from the displayed multiple thumbnails and then clicks on a button 706, the additional image extraction section 350 additionally displays the thumbnail 705 in the extracted image display region 702 in S507. Specifically, the image corresponding to the thumbnail 705 is newly added as the adopted image. In this event, a thumbnail group having time stamps before and after the time stamp of the thumbnail 705 may be presented to the user. For example, thumbnails related to the thumbnail 705 may be presented to the user by changing a background color of the thumbnail group or adding a mark to the thumbnail group.

If the thumbnails in the extracted image display region 702 include a thumbnail whose determination as the adopted image is wished to be suspended, the thumbnail may be temporarily moved to a temporary storage region 707. On the other hand, thumbnails in the temporary storage region 707 may be moved into the extracted image display region 702. Note that new information on the number of images is displayed in the region 701 every time such movement is performed.

There is a case where, even when thumbnails of adopted images are newly extracted from the thumbnails classified as the image having the dissatisfaction factor 704 selected by the user, the number of the adopted images does not reach the user-specified number. In such a case, the user newly selects another acceptable dissatisfaction factor (for example, underexposure) and performs again the processing described above to increase the number of the adopted images. When the number of the adopted images reaches the user-specified number, the adopted image group is copied to a user-specified folder. Thereafter, the series of processing is terminated.

Besides the above, for example, a function to perform image correction on the image group classified as the images having underexposure may be provided to the user. For example, the present invention may employ a configuration which allows the user to correct the image on a window for enlarged display and to check an effect of the correction. Thus, the user can determine whether or not to extract the image while checking the effect of the correction.

Moreover, a function to perform trimming of the image group classified as the images having a poor composition may be provided to the user. The trimming means cutting out a part of an image and thus changing the composition of the image. However, the trimming depends on a print layout. Thus, when individual images are small as in the case of index printing, trimming of an image to a very small size leads to no problem. On the other hand, when the print size is large, trimming of an image to a very small size is not preferable.

Although the dissatisfaction factor is previously set in the embodiment described above, the user may add or delete the dissatisfaction factor as need arises.

Figure 8:
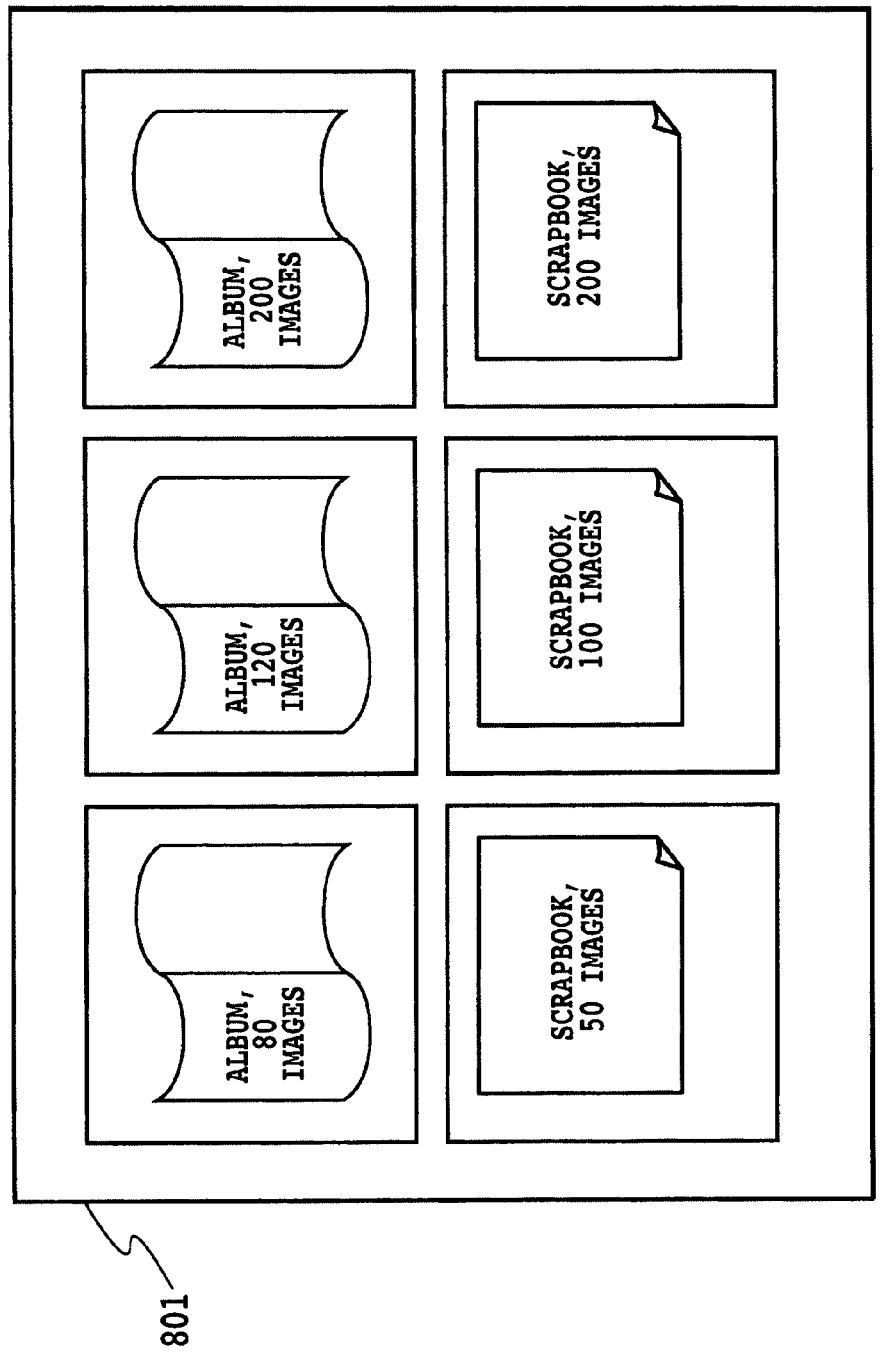
FIG. 8 is a view showing an example of a user interface provided in selection of a layout type according to the present invention.

In the embodiment described above, the description has been given mainly of the image extraction system. The image extraction system may be included in a layout creation system which implements album and index printing that are the ultimate goal. For example, a template select screen 801 for selecting a layout (album and scrapbook) template for a final work as shown in FIG. 8 may be presented on a screen first displayed after the start of the application. The user selects a desired template from those displayed on the template select screen 801. As shown in FIG. 8, the number of images required to create an album or the like is previously set for each of the templates. Note that, as to the number of images, the layout may allow a certain range such as 70 images to 80 images, for example.

As the layout template, various types of templates different from each other in the required number of images are prepared. For example, the present invention may employ a configuration in which the required number of images is fixed and, additionally, images of different sizes can be arranged, as in the case of a template shown in FIG. 9. The user can check a final image of a layout by pressing a layout checking button 1001 as appropriate while performing an image extraction operation through a UI screen shown in FIG. 10. For example, when an image whose composition is changed by trimming is arranged in a relatively large-sized region 901, a warning about the arrangement may be given based on the print size and the number of trimmed pixels.

Figure 9:
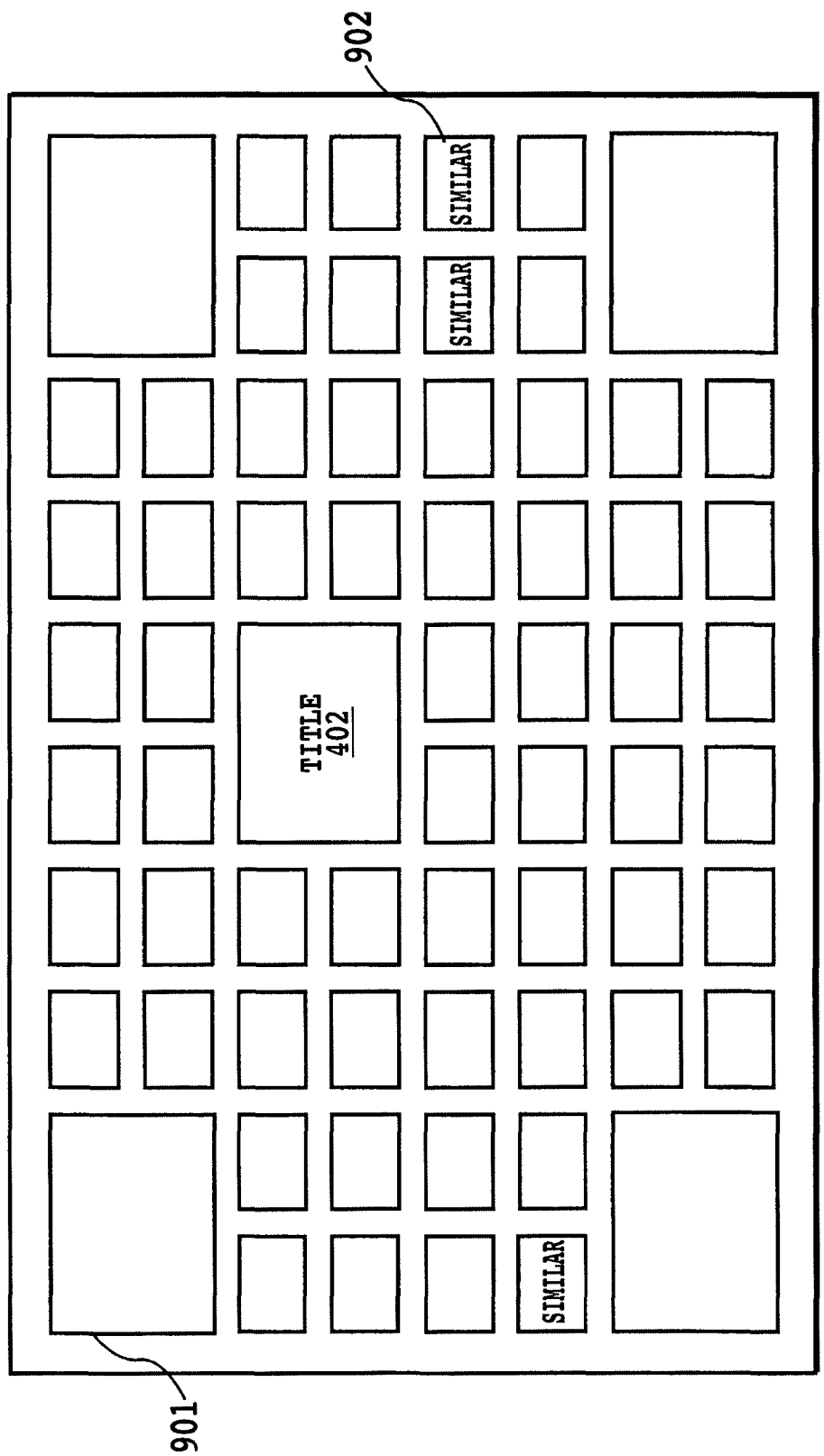
FIG. 9 is a view showing another example of a layout template according to the present invention.
Figure 10:
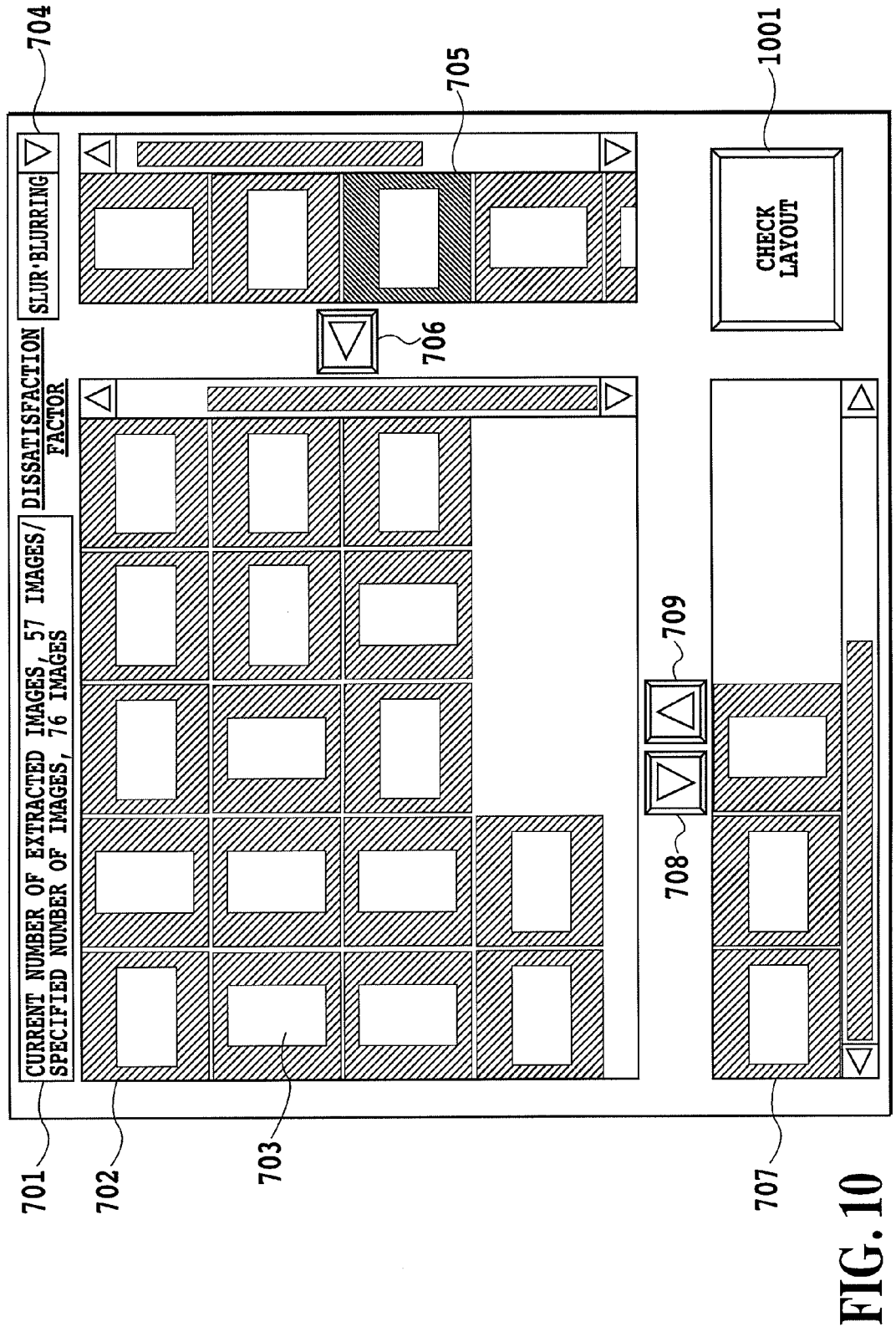
FIG. 10 is a view showing another example of a user interface provided in image addition according to the present invention.

Furthermore, it is interesting to arrange in an index manner images continuously shot by a digital still camera or the like (images classified as similar images) since movement can be expressed. However, when a line of similar images 902 is broken in the middle as shown in FIG. 9, balance is slightly impaired. Thus, attributes may be given to the individual images on the layout screen. For example, the user may be allowed to recognize that the similar images are arranged by providing markings 902 indicating the similar images or by setting colors of image frames of the similar images in the same color. Such a configuration allows the user to notice that the line of similar images is broken in the middle by looking at the layout screen. In such a case, the user can make an adjustment so as to display the similar images without breaking the line thereof by displaying a UI screen for performing an extraction operation and deleting a part of the image group or moving a part of the image group to the temporary storage region.

Moreover, in the embodiment described above, the description has been given of the configuration in which the dissatisfaction factor 704 is specified by the user. However, the specification may be automated according to the layout. For example, slur/blurring may cause no problem when the print size is small as in the case of the index printing. Thus, in the case of the index printing, the image classified as the image having slur/blurring is automatically and preferentially extracted. As a result, efficiency of the extraction operation can be improved. In this event, a slur amount may be determined to extract an image on the basis of a correlation between the print size and the slur amount.

OTHER EMBODIMENTS

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-235198, filed Sep. 12, 2008, which is hereby incorporated by reference herein in its entirety.

What is claimed is:

1. An apparatus comprising at least one processor which executes a program stored in a memory, and which performs steps comprising:
   extracting an image group including a plurality of images into a first image group with user satisfaction higher than a set reference and a second image group with user satisfaction lower than the set reference; and
   extracting an image having at least one dissatisfaction factor from the second image group on the basis of a dissatisfaction factor selected as acceptable to a user and adding the extracted image to the first image group, in a case where the number of images included in the first image group does not reach a specified number, until the number of images included in the first image group reaches the specified number.

2. The image processing apparatus according to claim 1, wherein, when the extracted images are to be printed in small size, slur/blurring is selected as the dissatisfaction factor.

3. The image processing apparatus according to claim 1, wherein the user satisfaction is determined on the basis of presence or absence of at least one of dissatisfaction factors including underexposure, poor color balance, slur/blurring, poor composition and a similar image.

4. The image processing apparatus according to claim 3, wherein a dissatisfaction factor is addable to or deletable from the dissatisfaction factors.

5. The image processing apparatus according to claim 1, wherein the set reference is changeable in accordance with the specified number.

6. The image processing apparatus according to claim 5, wherein the set reference is set high when the specified number is small and is set low when the specified number is large.

7. The image processing apparatus according to claim 3, wherein the dissatisfaction factor is changed according to a print size of an image.

8. The image processing apparatus according to claim 7, wherein the dissatisfaction factor changed according to a print size of image is slur/blurring.

9. A non-transitory computer-readable storage medium storing a program for allowing a computer to execute an image processing method of an image processing apparatus, the program allowing the computer to execute the steps of:
   classifying an image group including a plurality of images into a first image group with user satisfaction higher than a set reference and a second image group with user satisfaction lower than the set reference; and
   extracting an image having at least one dissatisfaction factor from the second image group on the basis of a dissatisfaction factor selected as acceptable to a user and adding the extracted image to the first image group, in a case where the number of images included in the first image group does not reach a specified number, until the number of images included in the first image group reaches the specified number.

10. An image processing method comprising the steps of:
    classifying an image group including a plurality of images into a first image group with user satisfaction higher than a set reference and a second image group with user satisfaction lower than the set reference; and
    extracting an image having at least one dissatisfaction factor from the second image group on the basis of a dissatisfaction factor selected as acceptable to a user and adding the extracted image to the first image group, in a case where the number of images included in the first image group does not reach a specified number, until the number of images included in the first image group reaches the specified number.

11. The image processing method according to claim 10, wherein, when the extracted images are to be printed in small size, slur/blurring is selected as the dissatisfaction factor.

12. The image processing apparatus according to claim 1, wherein the specified number is a user specified number.

13. The non-transitory computer-readable storage medium according to claim 9, wherein the specified number is a user specified number.

14. The image processing method according to claim 10, wherein the specified number is a user specified number.

15. The image processing apparatus according to claim 12, wherein after reception of the user specified number and in response to user selection of the dissatisfaction factor that is acceptable to the user, in a case where the number of images included in the first image group does not reach the user specified number, the extraction unit extracts images from the second image group that have the user selected dissatisfaction factor until the number of images reaches the user specified number.

16. The non-transitory computer-readable storage medium according to claim 13, wherein after reception of the user specified number and in response to user selection of the dissatisfaction factor that is acceptable to the user, in a case where the number of images included in the first image group does not reach the user specified number, the extracting step extracts images from the second image group that have the user selected dissatisfaction factor until the number of images reaches the user specified number.

17. The image processing method according to claim 14, wherein after reception of the user specified number and in response to user selection of the dissatisfaction factor that is acceptable to the user, in a case where the number of images included in the first image group does not reach the user specified number, the extracting step extracts images from the second image group that have the user selected dissatisfaction factor until the number of images reaches the user specified number.

18. The image processing apparatus according to claim 15, wherein the user selected dissatisfaction factor is selected from a plurality of dissatisfaction factors including at least underexposure, poor color balance, slur/blurring, poor composition and a similar image.

19. The non-transitory computer-readable storage medium according to claim 16, wherein the user selected dissatisfaction factor is selected from a plurality of dissatisfaction factors including at least underexposure, poor color balance, slur/blurring, poor composition and a similar image.

20. The image processing method according to claim 17, wherein the user selected dissatisfaction factor is selected from a plurality of dissatisfaction factors including at least underexposure, poor color balance, slur/blurring, poor composition and a similar image.

* * * * *